UNITED STATES PATENT OFFICE.

CARLETON ELLIS, OF MONTCLAIR, NEW JERSEY, ASSIGNOR, BY DIRECT AND MESNE ASSIGNMENTS, OF FOUR-TENTHS TO ELLIS-FOSTER COMPANY, A CORPORATION OF NEW JERSEY, AND SIX-TENTHS TO INDESTRUCTIBLE PAINT COMPANY, LTD., OF LONDON, ENGLAND, A CORPORATION.

PROCESS OF MAKING VARNISH MATERIAL.

1,242,161.   Specification of Letters Patent.   Patented Oct. 9, 1917.

No Drawing.   Application filed March 29, 1915. Serial No. 17,850.

*To all whom it may concern:*

Be it known that I, CARLETON ELLIS, a citizen of the United States, and a resident of Montclair, in the county of Essex and State of New Jersey, have invented certain new and useful Improvements in Processes of Making Varnish Material, of which the following is a specification.

This invention relates to a method of making varnish resin materials and the like including resin esters and to the product of such process and relates in particular to a method which involves certain improved or simplified operations and enables esters, anhydrids, lactones and the like, in some cases of almost complete neutrality to be prepared.

Rosin and other similar resins contain a large amount of acid material which colophonium very readily unites with basic bodies, such as white lead and zinc white, and when rosin, for example, is used as a component of grinding or mixing varnish the pigment combines with the resin acid and "livering" results, causing thickening of the product. To ameliorate this difficulty to some extent, rosin has been hardened by lime or other alkali which only partly neutralizes the acid. Lime resinate of a more neutral character would be too slightly soluble in the vehicle employed. Lime treatment therefore, does not overcome the difficulty. By esterifying resin with glycerin or other bodies containing the hydroxyl group, including the alcohols, sugars and also even that other class of hydroxylated bodies, the phenols, esters can be obtained which do not react deleteriously with the basic pigment employed. As ordinarily prepared, however, these products have the disadvantage of containing a certain amount of free acid, as for example, a commercial sample of rosin ester which was found to exhibit an acid number of about 50. Furthermore, the present method of making ester, or "ester gum," as it is known to the trade, involves heating the material under a pressure of several atmospheres, and then distilling *in vacuo*, which involves a series of operations with a plant of a costly character.

By the present invention it is possible to entirely eliminate the operation under pressure and *in vacuo*, although these may be used with the present process, if any advantage under special circumstances is derived by so doing. According to one illustrative form of the present invention ordinary rosin is treated with glycerin at an elevated temperature and under approximately atmospheric pressure with vigorous agitation while employing an excess of glycerin which is in part combined with the rosin and in part vaporized. The vaporized portion mingled with any water that may have formed during reaction is passed through a vertical separator and the condensed glycerin is returned to the container in which the reaction is taking place while more or less of the steam, arising from the water produced by the reaction or from materials which are not of an anhydrous character, pass away. Rosin spirits or other volatile organic material of similar character may also be removed in part along with the steam. Thus the volatilized glycerin is being constantly returned to the reaction chamber and an excess may be maintained so that reaction with the rosin takes places more readily than is the case when a merely sufficient quantity of glycerin is added to bring about the reaction. When rosin with an equivalent quantity of glycerin is heated the combination of the glycerin with the rosin diminishes the amount of glycerin while some of the latter is lost by distillation, etc., so that toward the end of the reaction only a small amount of glycerin may be present, while the conditions of esterification have reached the maximum of slowness. The presence of an excess of glycerin at this stage enables the reaction to take place to a desired degree without loss of costly material.

When rosin is heated in the neighborhood of 300° C., for some time it loses a considerable amount of water forming anhydrid-like material. If the rosin is heated in the presence of an adjacent mass of lime so that water is absorbed the reaction goes to substantial completion forming anhydrid-like material. Titration with alcoholic potash apparently gives the total acidity as free acid and anhydrid, while titration with aqueous solutions gives the acidity in terms of free acid only. When the above product is heated with glycerin reaction takes place giving a species of ester lactone product.

In heating rosin and glycerin when conditions are such that water is being evaporated, especially the water originally present as moisture in the glycerin, considerable foaming occurs to 200° or thereabout and the contents of the reaction vessel are liable to boil over. To obviate this a small amount of rosin with the glycerin is heated with agitation until a good part of the water is expelled and the remainder of the rosin then added, when the entire mixture is esterified.

Besides rosin, other resins such as the copal "gums" and the like may be esterified, as also mixtures of these gums with rosin. Benguela, Angola, Java, Manila, kauri and other copals, shellac, dammar, sandarac, and so-called South American or Brazilian copal and the like are included. Kongo copal gum is used herein in an illustrative manner. Resin obtained by extracting chips or dust of these materials, with suitable solvents may be used.

The sugars and starches are cheap sources of esterifying agents but carbohydrates such as glucose and related sugars have a tendency to darken during the heating, possibly by the formation of caramel. It is therefore desirable to carry on the reaction in this case at the lowest possible temperature which may be done by the passage of an inert gas through the mass particularly in conjunction with reduced atmospheric pressure and catalytic material. The mixture is placed in a heated agitator and an inert gas is passed through the mass while the latter is violently agitated. A vacuum pump communicating with the top of the closed reaction chamber enables the volatilized products of reaction to be removed and glycerin, if used with the sugar may be duly returned.

If the product is found to be not sufficiently hard for some varnish compositions it may be treated with a current of steam, preferably superheated, which removes the volatile constituents causing the material to increase in hardness. The steam does not greatly change the degree of esterification if the product is not exposed for too long a period to such action. The hardening operation may also be carried out by simply heating, the esterified mixture preferably with agitation or by passage of inert gas through the mass at the requisite temperature.

As an example 100 lbs. of rosin are heated with 12 lbs. of glycerin in a closed vessel fitted with an agitator. A vertical separator attached to the top of the vessel enables a return of the volatilized glycerin. The temperature is maintained for one to three hours at 260 to 290° C., then the vertical separator is cut off and the material heated with agitation for an hour or more at approximately the same temperature until volatile rosin spirits and excess of glycerin have been removed. The product is preferably cooled out of contact with the air and in fact during the entire operation it is desirable to prevent any material contact with the air. Carbonic acid gas may be used to protect the heated batch.

When mixed esters are desired a mixture of 8 lbs. glucose and 7 lbs. of glycerin are incorporated with 100 lbs. of rosin and heat at a somewhat lower temperature than the above to bring about reaction without carbonization. The excess of glycerin is then removed by steam or vacuum distillation.

The reaction between divers resins or resinous materials and esterifying materials is facilitated by the use of catalyzers, and agents such as aluminum oxid and titanium oxid may be used to effect an acceleration of, or otherwise improve the reaction or better the completion thereof. In place of aluminum oxid a few per cent. of aluminum salts such as aluminum acetate may be added to the material or finely divided aluminum or the metal in the form of scales. Satisfactory results may be obtained by using receptacles of aluminum, in which vessels the reaction takes place without discoloration of the product. The present invention therefore embraces the formation of ester material in contact with aluminum material and the like.

In the treatment of copal gums and similar hard resins some modification is ordinarily desired of the foregoing and the following will illustrate one modification thereof:

A quantity of Kongo copal resin or "gum" was heated in a closed receptacle provided with a condenser, the heating being carried on for about three and a half hours at approximately 315–325° C. About 12–15% of oily distillate was collected. At the end of this operation the resin was found to be completely soluble in benzol and the acid number was found to be 88 when titrated with alcoholic potash. One sixteenth part by weight of glycerin was then added to the fusion at 150° C. In place of the ordinary condenser a reflux condenser was employed and the mixture was gradually raised to 280° C., under constant stirring and in contact with aluminum. After a very short time the mass was converted into a spongy product, which solidified to a firm mass on cooling. It was not readily soluble in benzol and was very hard and somewhat darker in color than the original Kongo resin. This material was heated to slightly above 360° C., for a time when the acid number was found to be about 20. By operating at the boiling point of glycerin or at higher temperatures and preferably at about atmospheric pressure using the separator aforesaid the water is removed while glycerin is constantly returning to the superheated mass. If the esterification is carried out at temperatures well above 300° C., in the case of the copals, the water is rapidly eliminated and the ester formed while keeping the mass in a liquid state.

By the method of heating with a vertical separator rosin esters having an acid number below 10 and often only 5 or 6 may be obtained. They may be used in varnishes without further hardening. Such products form a part of the present invention.

A varnish ester or other resin or composite resin esters or rosin anhydrid or similar product of the process herein set forth may be melted and incorporated with varnish oils such as boiled or oxidized linseed or Chinese wood oil, or perilla oil and in some cases fish or whale oils and the semi-drying oils, such as cottonseed, corn, rape and the like. When the drying features of the oils are not taken into consideration, mineral oil may be introduced more or less. The composition is made up with varying proportions of the oil and resinous material, using a larger proportion to make the long oil varnishes and smaller proportions of oil in the case of short oil varnishes. When prepared for use as a varnish where the acidity of the composition is not a factor, various acid resins or otherwise, may be incorporated with the composition. When used for grinding or mixing varnishes, the composition should be sufficiently neutral to avoid any undesirable livering and may be ground with the pigments, such as zinc oxid, white lead and the like to give a paste or composition of the consistency desired. Suitable driers and also thinners such as turpentine, benzin, benzol, toluol and the like may be introduced in the desired amount. A composition prepared from rosin-Kongo copal ester may be heated finally with a small amount of lime so as to contain some lime resinate, or if desired zinc resinate is incorporated with about an equal amount of Chinese wood oil and linseed oil and which has been boiled to the desired varnish making consistency and is suitably thinned with benzin, or turpentine substitute and ground with a mixture of white lead and zinc oxid and containing also some barytes or other suitable extending material to make a thick paste on the one hand or a liquid of the consistency of paint as may be desired.

Varnish products for "enameling" the interior of tin cans used for preserving fruits and vegetables may be prepared from Kongo copal ester and the like. After packaging, the tins are sterilized at a high temperature which softens many varnishes and imparts a taste to the food product. By the present method very hard products adapted to be used in enamel mixtures may be obtained.

In a similar manner Manila copal, kauri, acid Pontianak and like resins, etc., may be esterified. In many cases it is desirable to use ordinary rosin in admixture therewith as it has a desirable fluxing action and the rosin may be added before or after the cracking operation and prior to esterification or during the esterification operation and of course due allowance must be made for the acidity of the rosin when endeavoring to produce a product of low acid number. Mixtures of the copals and other resins may be similarly treated. Thus mixed esters may be obtained such as the mixed ester of Kongo copal gum and ordinary rosin. A composition containing approximately equal parts of Kongo copal ester and rosin ester makes a suitable varnish for medium grade products. For higher grade products the proportion of Kongo copal gum may be increased, employing two or three parts of the latter to one part of rosin or thereabout. In cheaper varnishes these proportions may be reversed or otherwise varied.

Kongo copal gum as esterified above has a very high melting point and is extremely hard and more nearly resembles amber and Zanzibar or other rare copal resins. The present method affords a product which may be regarded to a considerable degree as simulating natural amber in respect to hardness, etc.

What I claim is:

1. The process of making a varnish material which comprises forming the anhydrid of rosin in the presence of Kongo copal gum and heating such mixture with glycerin; whereby the esters of glycerin are obtained.

2. The process of making a varnish composition which comprises esterifying rosin and copal by heating with glycerin at substantially atmospheric pressure and at a temperature above the boiling point of glycerin.

3. The process of esterifying copal gums which comprises cracking the gum to render it soluble in oil, in esterifying the cracked product with glycerin at a temperature above 300° C., and in recracking the esterified material.

4. The process of making a varnish ester which comprises esterifying together a mixture of Kongo copal gum and ordinary rosin with glycerin.

5. The process of making resin esters which comprises esterifying acid resin and glycerin with agitation in the presence of aluminum.

6. The process of making resin esters which comprises esterifying hard resin material with glycerin in the presence of aluminum and in heating the product to render it readily and permanently soluble in varnish thinners.

7. The process of esterifying copal gum which comprises cracking the gum to render it soluble in oil, in esterifying the cracked product with glycerin and in recracking the esterified material.

8. The process of making a varnish ester which comprises esterifying by heating together a mixture of Kongo copal gum and ordinary rosin with glycerin.

9. The process of making resin esters which comprises esterifying hard resin material comprising Kongo copal gum with glycerin in the presence of aluminum and in heating the product to render it soluble in varnish thinners.

10. The process of esterifying copal gums which comprises cracking the gum to render it soluble in oil, in esterifying the cracked product with glycerin at a temperature above 320° C., and in recracking the esterified material.

11. The process of making a varnish ester which comprises esterifying together a mixture of glycerin, Kongo copal gum and ordinary rosin without pressure and at a temperature above the boiling point of glycerin.

12. The process of making resin esters which comprises esterifying glycerin and hard and soft resins in the presence of aluminum.

13. The process of making resin esters which comprises esterifying copal resin at 340° C., and heating the resulting product until it becomes soluble in oil.

14. The process of making resin esters which comprises esterifying hard resin material with glycerin at 340° in the presence of aluminum and in heating the product to render it soluble in varnish thinners.

15. The process of esterifying copal gums which comprises cracking the gum to render it soluble in oil, in esterifying the cracked product with glycerin and in recracking the esterified material.

16. The process of making resin esters which comprises esterifying acid resin in the presence of aluminum.

17. The process of making resin esters which comprises esterifying hard resin material with glycerin in the presence of aluminum and in heating the product to render it soluble in varnish thinners.

18. The process of making rosin esters adapted for surface finish compositions which comprises esterifying acid resin by heating the reaction mass out of contact with discoloring agents and in contact with aluminum.

19. The process of making resin esters adapted for surface finish compositions which comprises esterifying resinous material containing rosin by heating the reaction mass in a chamber having essentially aluminum walls in contact with said reaction mass.

Signed at Montclair in the county of Essex and State of New Jersey this 26th day of March 1915.

CARLETON ELLIS.

Witnesses:
W. O. HENKE,
B. M. ELLIS.